US008236077B2

(12) United States Patent
Gomiciaga-Pereda et al.

(10) Patent No.: US 8,236,077 B2

(45) Date of Patent: Aug. 7, 2012

(54) HANDHELD CLEANING APPLIANCE

(75) Inventors: Ricardo Gomiciaga-Pereda, Malmesbury (GB); Michael James Peace, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 86 days.

(21) Appl. No.: 12/307,249

(22) PCT Filed: Jul. 6, 2007

(86) PCT No.: PCT/GB2007/002529

§ 371 (c)(1),
(2), (4) Date: Aug. 21, 2009

(87) PCT Pub. No.: WO2008/009886

PCT Pub. Date: Jan. 24, 2008

(65) Prior Publication Data

US 2009/0313959 A1 Dec. 24, 2009

(30) Foreign Application Priority Data

Jul. 18, 2006 (GB) .................................. 0614237.6
Sep. 20, 2006 (GB) .................................. 0618491.5

(51) Int. Cl.
*B01D 45/00* (2006.01)

(52) U.S. Cl. ................ 55/343; 55/337; 55/345; 55/346; 55/447; 55/424; 55/428; 55/DIG. 3

(58) Field of Classification Search .................... 55/343, 55/DIG. 3; 15/353
See application file for complete search history.

(56) References Cited

U.S. PATENT DOCUMENTS

| | | | | | |
|---|---|---|---|---|---|
| 2,399,509 | A * | 4/1946 | Rich | ............................... | 55/343 |
| D471,683 | S * | 3/2003 | Dyson et al. | .................... | D32/30 |
| 6,582,489 | B2 * | 6/2003 | Conrad | ........................... | 55/337 |
| 6,835,222 | B2 * | 12/2004 | Gammack | ........................ | 55/345 |
| D505,761 | S * | 5/2005 | Gammack et al. | ............. | D32/21 |
| D518,611 | S * | 4/2006 | Hare | .............................. | D32/21 |

(Continued)

FOREIGN PATENT DOCUMENTS

CN 1751800 3/2006

(Continued)

OTHER PUBLICATIONS

International Search Report and Written Opinion mailed on Nov. 6, 2007 directed towards international application No. PCT/GB2007/002529; 9 pages.

(Continued)

*Primary Examiner* — Jason M Greene
*Assistant Examiner* — Dung H Bui
(74) *Attorney, Agent, or Firm* — Morrison & Foerster LLP

(57) ABSTRACT

A handheld cleaning appliance includes a dirty air inlet, a clean air outlet and separating apparatus for separating dirt and dust from an airflow in an airflow path leading from the air inlet to the air outlet. The separating apparatus includes a cyclonic separator having at least one first cyclone and a plurality of second cyclones arranged in parallel with one another and located downstream of the first cyclone. By providing a cyclonic separator having a plurality of second cyclones in parallel, the handheld cleaning appliance is capable of separating fine dirt and dust particles without using barriers such as filters or bags which need maintenance to ensure that performance remains high over a period of time.

14 Claims, 3 Drawing Sheets

U.S. PATENT DOCUMENTS

| | | | | |
|---|---|---|---|---|
| 7,097,680 | B2 * | 8/2006 | Oh | 55/343 |
| D555,849 | S * | 11/2007 | Choi et al. | D32/21 |
| D556,962 | S * | 12/2007 | Choi et al. | D32/21 |
| D557,469 | S * | 12/2007 | Choi et al. | D32/21 |
| D557,470 | S * | 12/2007 | Choi et al. | D32/21 |
| D577,163 | S * | 9/2008 | Dyson et al. | D32/21 |
| D582,115 | S * | 12/2008 | Peace et al. | D32/31 |
| D583,117 | S * | 12/2008 | Peace et al. | D32/31 |
| 7,488,362 | B2 * | 2/2009 | Jeong et al. | 55/337 |
| 7,537,625 | B2 * | 5/2009 | Han et al. | 55/343 |
| 7,547,336 | B2 * | 6/2009 | Fester et al. | 55/337 |
| 7,547,351 | B2 * | 6/2009 | Oh et al. | 95/271 |
| 7,563,297 | B2 * | 7/2009 | Kim | 55/343 |
| 7,563,298 | B2 * | 7/2009 | Oh | 55/343 |
| 7,601,188 | B2 * | 10/2009 | Hwang et al. | 55/343 |
| 7,651,544 | B1 * | 1/2010 | Fester et al. | 55/343 |
| 7,655,058 | B2 * | 2/2010 | Smith | 55/349 |
| 7,686,858 | B2 * | 3/2010 | Oh | 55/345 |
| 7,686,861 | B2 * | 3/2010 | Oh | 55/429 |
| 7,731,769 | B2 * | 6/2010 | Min | 55/337 |
| 7,749,292 | B2 * | 7/2010 | Pan et al. | 55/345 |
| 7,771,499 | B2 * | 8/2010 | Oh et al. | 55/343 |
| 2002/0066366 | A1 * | 6/2002 | Conrad et al. | 95/57 |
| 2002/0189048 | A1 | 12/2002 | Maruyama et al. | |
| 2006/0048487 | A1 * | 3/2006 | Song et al. | 55/343 |
| 2006/0059871 | A1 | 3/2006 | Han et al. | |
| 2006/0137302 | A1 * | 6/2006 | Min | 55/337 |
| 2006/0137304 | A1 * | 6/2006 | Jeong et al. | 55/337 |
| 2006/0150587 | A1 * | 7/2006 | Hong et al. | 55/343 |
| 2006/0230716 | A1 * | 10/2006 | Oh et al. | 55/343 |
| 2006/0230717 | A1 * | 10/2006 | Oh et al. | 55/343 |
| 2008/0184893 | A1 * | 8/2008 | Oh et al. | 96/416 |
| 2009/0031524 | A1 * | 2/2009 | Courtney et al. | 15/347 |
| 2009/0313958 | A1 * | 12/2009 | Gomiciaga-Pereda et al. | 55/317 |

FOREIGN PATENT DOCUMENTS

| | | |
|---|---|---|
| EP | 1692991 | 8/2006 |
| GB | 1 207 278 | 9/1970 |
| GB | 2035787 | 6/1980 |
| GB | 2360719 | 10/2001 |
| GB | 2410913 | 8/2005 |
| GB | 2 416 721 | 2/2006 |
| JP | 2003-528704 | 9/2003 |
| JP | 2004-337427 | 12/2004 |
| JP | 2004-351234 | 12/2004 |
| JP | 2005-80975 | 3/2005 |
| WO | WO-01/74493 | 10/2001 |
| WO | WO-2004/069021 | 8/2004 |
| WO | WO-2006/076363 | 7/2006 |

OTHER PUBLICATIONS

International Preliminary Report on Patentability completed on Nov. 13, 2008 directed towards international application No. PCT/GB2007/002529; 6 pages.

British Search Report completed on Nov. 8, 2006 directed towards foreign application No. GB0614237.6; 1 page.

British Search Report completed on Dec. 20, 2006 directed towards foreign application No. GB0618491.5; 1 page.

* cited by examiner

HANDHELD CLEANING APPLIANCE

REFERENCE TO RELATED APPLICATIONS

This application is a national stage application under 35 USC 371 of International Application No. PCT/GB2007/002529, filed Jul. 6, 2007, which claims the priority of United Kingdom Application Nos. 0614237.6 and 0618491.5, filed Jul. 18, 2006, and Sep. 20, 2006, respectively, the contents of which prior applications are incorporated herein by reference.

FIELD OF THE INVENTION

The invention relates to a handheld cleaning appliance particularly, but not exclusively, to a handheld vacuum cleaner. More particularly, the invention relates to a handheld cleaning appliance having a cyclonic separator.

BACKGROUND OF THE INVENTION

Handheld vacuum cleaners are well known and have been manufactured and sold by various manufacturers for several years. Typically, a handheld vacuum cleaner comprises a casing which houses a motor and fan unit for drawing air into the cleaner via an inlet, and a separation device such as a filter or bag for separating dirt and dust from the incoming airflow. An example of such a vacuum cleaner is shown in GB1207278.

Handheld vacuum cleaners have more recently been developed to incorporate cyclonic separation systems which are capable of removing larger items of debris from the airflow before removing finer particles using a filter or other barrier means. An example of such a device is sold by Black & Decker under the trade name DUSTBUSTER®. A further example of a handheld vacuum cleaner incorporating a cyclonic separator is shown in GB2035787A.

A disadvantage of known handheld vacuum cleaners which utilise cyclonic separators is that, when only a single cyclone is used followed by a filter or bag, the filter will require maintenance, either by washing or by replacement. Failure to maintain the filter will result in a decrease in performance. It is therefore an object of the invention to provide a handheld cleaning appliance which is capable of sustaining high performance for longer than known handheld vacuum cleaners. It is a further object of the present invention to provide a handheld cleaning appliance which requires less maintenance than existing appliances. A further object of the present invention is to provide a handheld vacuum cleaner which is capable of developing and sustaining higher suction power than is possible with current designs of handheld vacuum cleaner.

SUMMARY OF THE INVENTION

The invention provides a handheld cleaning appliance comprising a dirty air inlet, a clean air outlet and separating apparatus located in an airflow path leading from the air inlet to the air outlet for separating dirt and dust from an airflow, the separating apparatus comprising a cyclonic separator having at least one first cyclone, wherein the cyclonic separator further comprises a plurality of second cyclones arranged in parallel with one another and located downstream of the or each first cyclone.

By providing a cyclonic separator which comprises a plurality of second cyclones in parallel, the handheld cleaning appliance becomes capable of separating fine dirt and dust particles without using barrier means such as filters or bags which need maintenance to ensure that performance remains high over a period of time. It has hitherto been considered difficult to provide a cyclonic separator of this type in a handheld vacuum cleaner because the space occupied by this type of cyclonic separator is considered to be too bulky and heavy to be suitable for a handheld machine. A further advantage of providing a cyclonic separator of this type in a handheld vacuum cleaner is that the cleaner is then capable of sustaining high suction power because there is no barrier-type filter means to cause a reduction in suction power, and hence pick-up capability, over time.

Preferably, the handheld cleaning appliance includes a handle and the cyclonic separator lies between the handle and the dirty air inlet. This provides an arrangement which is well balanced for a user of this type of cleaning appliance.

It is preferred that the cyclonic separator lies substantially parallel to the handle, and it is further preferred that the cyclonic separator lies in a generally upright configuration. These features have been found to be beneficial for manipulation and for convenient storage and emptying of the dirt and dust collected in the cyclonic separator.

In a preferred embodiment of the invention, a single first cyclone is provided and the second cyclones are spaced around an axis of the first cyclone. This provides a compact arrangement which is balanced for ease of manipulation. It is more preferable that each of the second cyclones has an end which projects into the first cyclone so as to provide a convenient balance of dirt collecting capacity and overall volume of the cyclonic separator.

BRIEF DESCRIPTION OF THE DRAWINGS

An embodiment of the invention will now be described with reference to the accompanying drawings, in which.

DETAILED DESCRIPTION OF THE INVENTION

Figure 1:
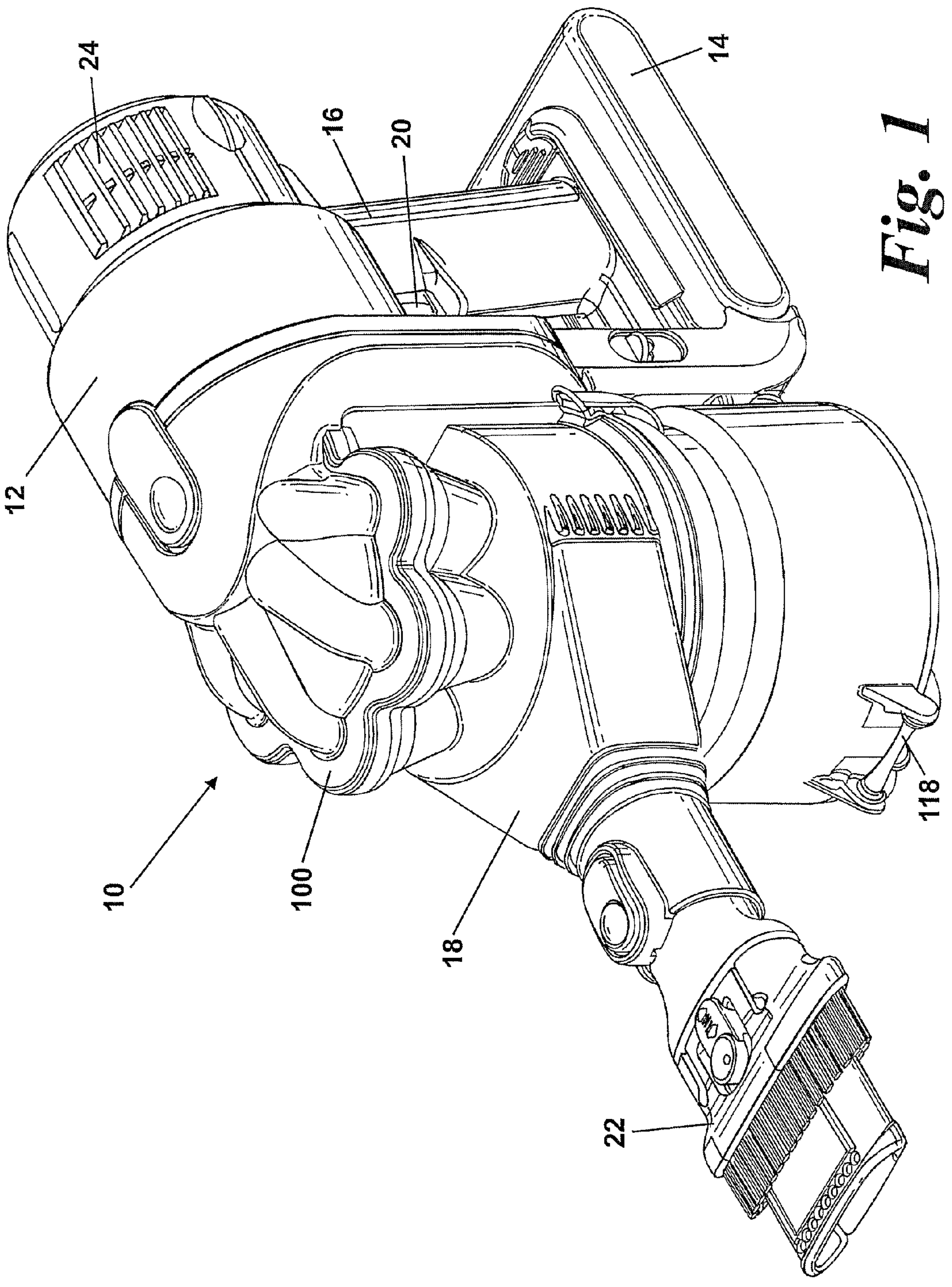
FIG. 1 shows a handheld cleaning appliance according to the invention.
Figure 2:
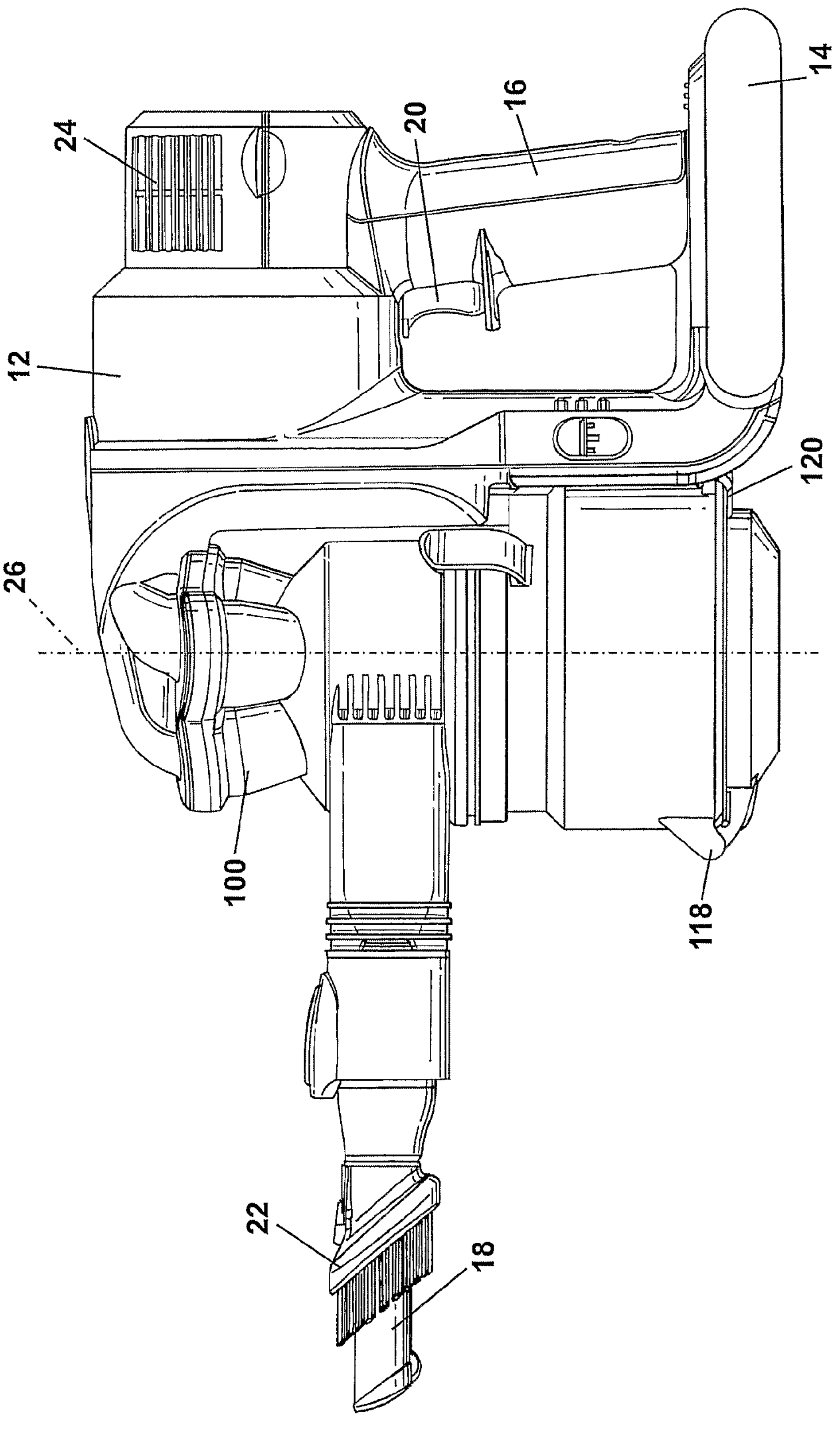
FIG. 2 is a side view of the appliance of FIG. 1.

FIGS. 1 and 2 show a handheld vacuum cleaner 10. The handheld vacuum cleaner 10 has a main body 12 which houses a motor and fan unit (not shown). The main body 12 also includes a power source 14 such as a battery. A handle 16 is provided on the main body 12 for manipulating the handheld vacuum cleaner 10 in use. A cyclonic separator 100 is attached to the main body 12. A dirty air inlet 18 extends from a portion of the cyclonic separator 100 remote from the main body 12. A brush tool 22 is slidably mounted on the distal end of the dirty air inlet 18. A set of exhaust vents 24 are provided on the main body 12 for exhausting air from the handheld vacuum cleaner 10.

The cyclonic separator 100 is located between the main body 12 and the dirty air inlet 18. Consequently, the cyclonic separator 100 is located between the handle 16 and the dirty air inlet 18. The cyclonic separator 100 has a longitudinal axis 26 which extends in a generally upright direction so that the axis 26, and therefore the cyclonic separator 100, lies substantially parallel to the direction in which the handle 16 extends.

The orientation of the handle 16 is such that, when the user grips the handle 16, the user's hand forms a fist in a manner similar to that adopted when gripping a saw. This ensures that the user's wrist is not strained more than necessary when manipulating the handheld vacuum cleaner 10 for cleaning purposes. The cyclonic separator 100 is positioned close to the handle 16 which also reduces the moment applied to the user's wrist when the handheld vacuum cleaner 10 is in use. The handle 16 carries an on/off switch 20 in the form of a trigger for turning the vacuum cleaner motor on and off.

Figure 3:
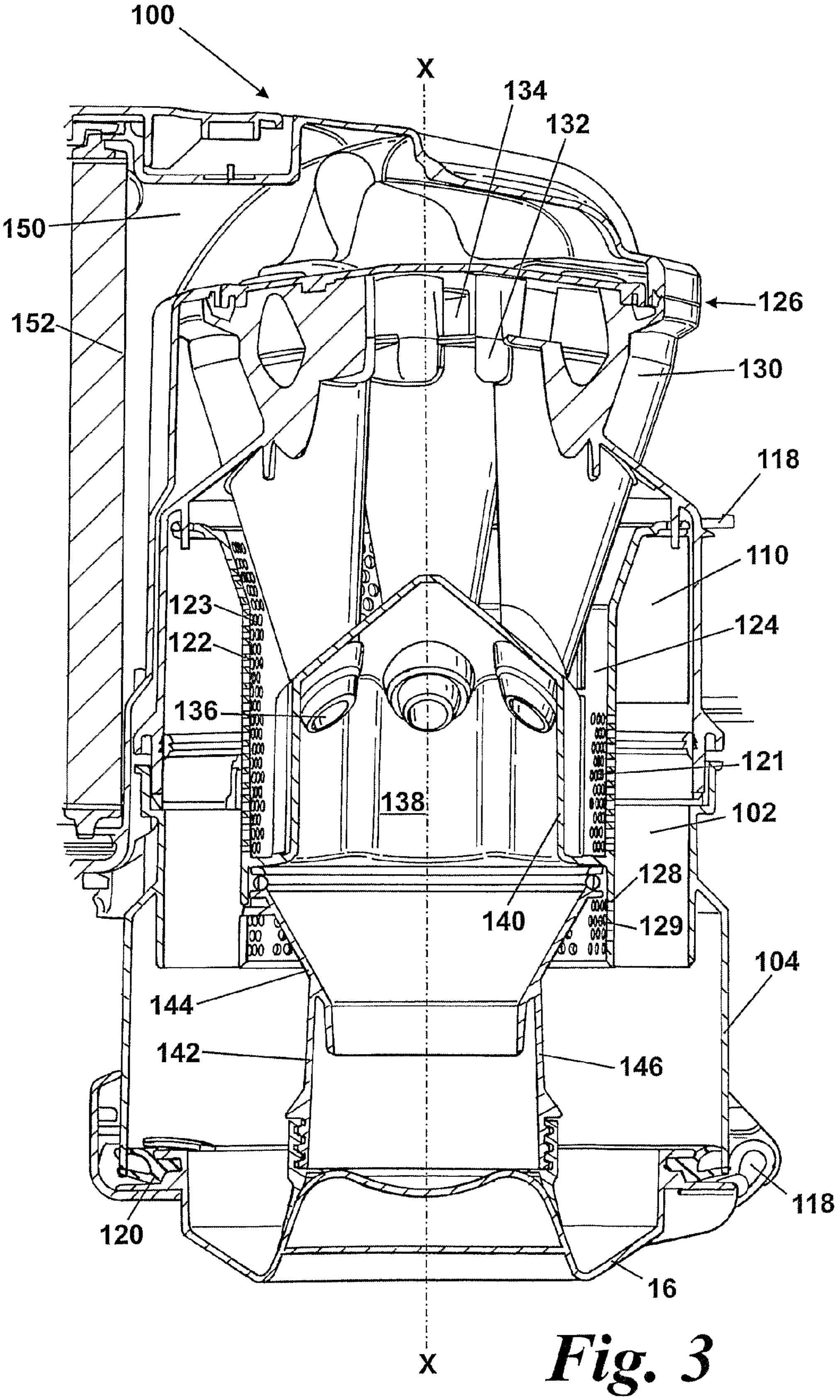
FIG. 3 is a longitudinal cross section through the cyclonic separating apparatus forming part of the appliance of FIG. 1.

The cyclonic separating apparatus 100 forming part of the handheld vacuum cleaner 10 is shown in more detail in FIG. 3. The cyclonic separating apparatus 100 comprises a first cyclone 102 which has a longitudinal axis X-X and a wall 104. An inlet 110 is formed in the upper portion of the wall 104. The inlet 110 is in communication with the dirty air inlet 18 and forms a communication path between the dirty air inlet 18 and the interior of the first cyclone 102. The air inlet 110 is arranged tangentially to the first cyclone 102 so that the incoming air is forced to follow a helical path around the interior of the first cyclone 102.

A base 116 closes one end of the first cyclone 102. The base 116 is pivotably mounted on the lower end of the first cyclone wall 104 by means of a hinge 118. The base 116 is retained in a closed position (as shown the figures) by means of a catch 120.

A shroud 121 is located inwardly of the wall 104 of the first cyclone 102. The shroud 121 comprises a cylindrical wall 122 having a plurality of through-holes 123. The shroud 121 surrounds an outlet 124 from the first cyclone 102. The outlet 124 provides a communication path between the first cyclone 102 and a second cyclone assembly 126. A lip 128 is provided at the base of the shroud 121. The lip 128 has a plurality of through-holes 129 which are designed to allow air to pass through but to capture dirt and dust.

The second cyclone assembly 126 comprises a plurality of second cyclones 130 arranged in parallel with one another. In this embodiment, six second cyclones 130 are provided. The second cyclones 130 are arranged around the axis X-X of the first cyclone 102. The arrangement of the second cyclones 130 is such that the second cyclones are spaced equi-angularly around the axis X-X. Each second cyclone 130 has a tangentially-arranged air inlet 132 and an air outlet 134. Each air inlet 132 and air outlet 134 is located at a first end of the respective second cyclone 130. A cone opening 136 is located at a second end of each second cyclone 130. The plane of the cone opening 136 of each second cyclone 130 is inclined with respect to a longitudinal axis (not shown) of the respective further cyclone 130. The cone opening 136 of each of the second cyclones 130 is in communication with a passageway 138 defined by a wall 140 located inwardly of the shroud 121.

The second end of each second cyclone 130 projects into the interior of the first cyclone 102. However, the first end of each second cyclone 130 lies outside the envelope of the first cyclone 102. In the orientation shown, it is the lower end of each second cyclone 130 which projects into the upper end of the first cyclone 102. The inlet 110 is also arranged at the upper end of the first cyclone 102 so that the inlet 110 is located in the region of the cyclonic separator 100 in which the first and second cyclones 102, 130 overlap. Because the first ends of the second cyclones 130 lie outside the envelope of the first cyclone, this region of the cyclone separator 100 lies intermediate the upper end of the cyclone separator 100 and the lower end of the cyclone separator 100. Connecting the dirty air inlet 18 to the cyclone separator 100 at an intermediate portion thereof is beneficial for the manipulation of the handheld vacuum cleaner 10 and avoids the lower extremities of the appliance being accidentally knocked on surfaces away from the area being cleaned.

A collector 142 is located at the lower end of the passageway 138. The collector 142 comprises a frustoconical first portion 144 and a cylindrical second portion 146. The interior of the collector 142 is delimited by the base 116 and the sides of the first and second portions 144, 146 of the collector 142.

Each of the air outlets 134 of the second cyclones 130 is in communication with a duct 150. The duct 150 provides an airflow path from the cyclonic separating apparatus 100 into other parts of the handheld vacuum cleaner 10. Located at the downstream end of the duct 150 is a pre-motor filter 152. The pre-motor filter 152 comprises a porous material such as foam and can also include a fine filter material. The pre-motor filter 152 is designed to prevent any fine dust particles from entering the motor and causing damage thereto.

In use, when the on/off switch 20 is depressed, the motor and fan unit draws a flow of dirt-laden air into the dirty air inlet 18 and then into the cyclonic separator 100. Dirt-laden air enters the cyclonic separator 100 through the inlet 110. Due to the tangential arrangement of the inlet 110, the airflow is forced to follow a helical path around the interior of the wall 104. Larger dirt and dust particles are separated by cyclonic motion around the wall 104. These particles are then collected at the base 116 of the first cyclone 102.

The partially-cleaned airflow then flows back up the interior of the first cyclone 102 and exits the first cyclone 102 via the through-holes in the shroud 121. Once the airflow has passed through the shroud 121, it enters the outlet 124 and from there is divided between the tangential inlets 132 of each of the second cyclones 130. Each of the second cyclones 130 has a diameter which is smaller than that of the first cyclone 102. Therefore, the second cyclones 130 are able to separate smaller particles of dirt and dust from the partially-cleaned airflow than the first cyclone 102. Separated dirt and dust exits the second cyclones 130 via the cone openings 136. Thereafter, the separated dirt and dust passes down the passageway 138 and into the collector 142. The separated dirt and dust eventually settles at the bottom of the collector 142 on the base 116.

Cleaned air then flows back up the second cyclones 130, exits the second cyclones 130 through the air outlets 134 and enters the duct 150. The cleaned air then passes from the duct 150 sequentially through the pre-motor filter 152, the motor and fan unit, and a post-motor filter before being exhausted from the vacuum cleaner 10 through the air vents 24.

The first cyclone 102 and the collector 142 can be emptied simultaneously by releasing the catch 120 to allow the base 116 to pivot about the hinge 118 so that the separated dirt and dust can fall away from the cyclonic separator 100. This allows efficient and reliable emptying of the dirt and dust from the cyclonic separator 100 at periodic intervals convenient to the user.

The invention is not limited to the precise details of the embodiment described above. For example, the number of second cyclones can be varied, as can the detail of their design, such as their cone angle, axis inclination and cone opening inclination. The collected dirt and dust can be released in other ways, such as by complete removal of the lower portion of the first cyclone 102, and the location of the on/off switch may be varied.

The invention claimed is:

1. A handheld cleaning appliance comprising a dirty air inlet, a clean air outlet, a handle, and a separating apparatus located in an airflow path leading from the dirty air inlet to the clean air outlet for separating dirt and dust from an airflow, the separating apparatus comprising a cyclonic separator having at least one first cyclone and a plurality of second cyclones arranged in parallel with one another and located downstream of the first cyclone, and the handle and the dirty air inlet being arranged opposite one another about the cyclonic separator wherein a single first cyclone is provided and wherein the second cyclones are spaced around a longitudinal axis of the first cyclone.

2. The handheld cleaning appliance of claim 1, wherein a longitudinal axis of the cyclonic separator lies substantially parallel to the handle.

3. The handheld cleaning appliance of claim 1, wherein the appliance further comprises a power source comprising a battery.

4. The handheld cleaning appliance of claim 1, wherein the handle and the dirty air inlet are arranged on opposite sides of a longitudinal axis of the cyclonic separator.

5. The handheld cleaning appliance of claim 1, comprising a main body which houses a motor and fan unit for drawing air flow along the airflow path between the dirty air inlet and the clean air outlet, and a power source configured to power the motor and fan unit.

6. The handheld cleaning appliance of claim 1 or 2, wherein the cyclonic separator lies in a generally upright configuration.

7. The handheld cleaning appliance of claims 1 or 2, wherein each of the second cyclones has an end which projects into the first cyclone.

8. The handheld cleaning appliance of claim 7, wherein the dirty air inlet is connected to the cyclonic separator at a location which is adjacent the ends of the second cyclones which project into the first cyclone.

9. The handheld cleaning appliance of claim 7, wherein the cyclonic separator lies in a generally upright configuration.

10. The handheld cleaning appliance of claim 1 or 2, wherein the cyclonic separator has a first end and a second end and the dirty air inlet is connected to the cyclonic separator at a location intermediate the first and second ends thereof.

11. The handheld cleaning appliance of claim 10, wherein the dirty air inlet is connected to the cyclonic separator at a location which is adjacent ends of the second cyclones which project into the first cyclone.

12. The handheld cleaning appliance of claim 10, wherein a single first cyclone is provided.

13. The handheld cleaning appliance of claim 12, wherein the second cyclones are spaced around a longitudinal axis of the first cyclone.

14. The handheld cleaning appliance of claim 10, wherein the cyclonic separator lies in a generally upright configuration.

* * * * *